(12) United States Patent
Denefleh et al.

(10) Patent No.: US 12,142,987 B2
(45) Date of Patent: *Nov. 12, 2024

(54) DRIVE, INCLUDING AN ELECTRIC MOTOR AND A TRANSMISSION, AND METHOD FOR PRODUCING A DRIVE

(71) Applicant: SEW-EURODRIVE GMBH & CO. KG, Bruchsal (DE)

(72) Inventors: Roland Denefleh, Einhausen (DE); Oliver Bühn, Kraichtal (DE); Henning Unterburg, Karlsruhe (DE); Martin Kerschbaum, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 520 days.

This patent is subject to a terminal disclaimer.

(21) Appl. No.: 17/526,558

(22) Filed: Nov. 15, 2021

(65) Prior Publication Data

US 2022/0077740 A1    Mar. 10, 2022

Related U.S. Application Data

(63) Continuation of application No. 16/487,722, filed as application No. PCT/EP2018/025036 on Feb. 12, 2018, now Pat. No. 11,190,078.

(30) Foreign Application Priority Data

Feb. 21, 2017   (DE) ..................... 10 2017 001 646.1

(51) Int. Cl.
*H02K 5/16*       (2006.01)
*H02K 5/22*       (2006.01)
*H02K 7/116*      (2006.01)

(52) U.S. Cl.
CPC ................. *H02K 5/16* (2013.01); *H02K 5/22* (2013.01); *H02K 7/116* (2013.01)

(58) Field of Classification Search
CPC . H02K 5/16; H02K 5/22; H02K 7/116; F16H 2057/02073; F16H 57/021;
(Continued)

(56) References Cited

U.S. PATENT DOCUMENTS 7,839,037 B2   11/2010   Oberle et al.
8,957,559 B2    2/2015   Schneider et al.
(Continued)

FOREIGN PATENT DOCUMENTS

CN      102280963 A    12/2011
DE      10319187 A1    11/2004
(Continued)

OTHER PUBLICATIONS

International Search Report issued May 11, 2018, in International Application No. PCT/EP2018/025036 (English-language translation).
(Continued)

*Primary Examiner* — Christopher M Koehler
*Assistant Examiner* — Riley Owen Stout
(74) *Attorney, Agent, or Firm* — Carter, DeLuca & Farrell LLP (57) ABSTRACT

A drive includes an electric motor, having a rotor shaft rotatably mounted in a motor housing by bearing(s), and a transmission, having a transmission housing including a housing part and a cover part connected together. A bayonet guide region is arranged on, and projects into a recess of, the housing part. An adapter flange is connected to the motor housing in a torsion-resistant manner and includes a lug region engageable behind the bayonet guide region. The recess is restricted in the circumferential direction by a holding fin provided on the housing part, extending from a bearing receptacle of the bearing of the input shaft of the transmission in the radial direction and is restricted counter (Continued)

to the circumferential direction by a further holding fin provided on the housing part, extending from a bearing receptacle of the bearing of the input shaft in the radial direction.

18 Claims, 10 Drawing Sheets

(58) Field of Classification Search
CPC .................. F16H 57/031; F16H 57/02; F16H 2057/02034; F16H 2057/02069
See application file for complete search history.

(56) References Cited

U.S. PATENT DOCUMENTS

| | | |
|---|---|---|
| 2004/0103733 A1 | 6/2004 | Sumita et al. |
| 2013/0169092 A1 | 7/2013 | Neuhaus et al. |
| 2015/0349606 A1 | 12/2015 | Filzen et al. |
| 2019/0232819 A1* | 8/2019 | Hoffmann ............ H02K 7/1166 |

FOREIGN PATENT DOCUMENTS

| | | |
|---|---|---|
| DE | 20315905 U1 | 2/2005 |
| DE | 102005030217 A1 | 1/2007 |
| DE | 202006014231 U1 | 3/2007 |
| DE | 102009044589 A1 | 10/2010 |
| DE | 102011054958 A1 | 5/2013 |
| DE | 102012202049 A1 | 8/2013 |
| DE | 102012007958 A1 | 10/2013 |
| DE | 102015009091 B3 | 11/2016 |

OTHER PUBLICATIONS

International Preliminary Report on Patentability issued Sep. 6, 2019, in International Application No. PCT/EP2018/025036 (English-language translation).

* cited by examiner

DRIVE, INCLUDING AN ELECTRIC MOTOR AND A TRANSMISSION, AND METHOD FOR PRODUCING A DRIVE

CROSS-REFERENCE TO RELATED APPLICATIONS

The present application is a continuation of U.S. patent application Ser. No. 16/487,722, which is the national stage of PCT/EP2018/025036, having an international filing date of Feb. 12, 2018, and claims priority to application Ser. No. 102017001646.1, filed in the Federal Republic of Germany on Feb. 21, 2017, each of which is expressly incorporated herein in its entirety by reference thereto.

FIELD OF THE INVENTION

The present invention relates to a drive that includes an electric motor and a transmission, and to a method for producing a drive.

BACKGROUND INFORMATION

Certain conventional electromotoric drives have an electric motor and a transmission.

German Published Patent Document No. 20 2006 014 231 describes an electromotoric kitchen appliance having a bayonet lock for an electric motor and a gear stage.

U.S. Patent Application Publication No. 2015/0349606 describes an electric device.

German Published Patent Document No. 10 2012 007 958 describes an electric tool having an intermediate gear.

German Published Patent Document No. 10 2005 030 217 describes an electric motor and a transmission unit for actuators in a motor vehicle.

German Published Patent Document No. 10 2011 054 958 describes a housing of an actuator for the accommodation of an electric motor.

Chinese Published Patent Document No. 102280963 describes an electric drive.

German Published Patent Document No. 10 2012 202 049 describes an electric machine.

German Published Patent Document No. 10 2009 044 589 describes a method for improving the structural quality of bearing pedestals in a cylinder block.

SUMMARY

Example embodiments of the present invention provide a drive having simplified production.

According to example embodiments of the present invention, a drive includes an electric motor and a transmission. A housing of the transmission has a housing part and a cover part, which are connected to each other, in particular. A bayonet guide region is provided on the housing part. The electric motor has a rotor shaft and a motor housing, and the rotor shaft is rotatably mounted in the motor housing with the aid of at least one bearing. An adapter flange is connected to the motor housing in a torsion-resistant manner, and the adapter flange has a lug region, in particular a bayonet nose, in particular for an engagement behind the bayonet guide region. The bayonet guide region projects into a recess of the housing part, and the recess is restricted in the circumferential direction by a holding fin provided on the housing part, which extends from a bearing receptacle of the bearing of the input shaft of the transmission, in particular in relation to the axial direction of the input shaft, in the radial direction. For example, the recess is restricted counter to the circumferential direction by a further holding fin provided on the housing part, which extends from a bearing receptacle of the bearing of the input shaft in the radial direction.

This offers the advantage that the holding fin stabilizes a bearing receptacle and for this purpose, extends radially away from the bearing receptacle to the edge region of the housing part. This makes it possible to achieve a stabilization of the bearing receptacle and also a restriction of the movement range of the bayonet nose. A compact configuration is therefore achievable as well inasmuch as the bayonet nose engages behind the bayonet guide region and is thereby guided in a keyed connection.

According to example embodiments, the bayonet guide region touches the further holding fin, in which case the bayonet guide region, the further holding fin and the bearing receptacle are integrally arranged, especially molded, in particular as one part. This offers the advantage that the further holding fin and the bayonet guide region may be formed on the housing part in an integral fashion, and thus are able to be produced in one piece.

According to example embodiments, the housing of the transmission has a housing part and a cover part, which are connected to each other, in particular, a shaft of the transmission is mounted via bearings, a first bearing of the bearings is accommodated in a bearing receptacle that is developed on the housing part, and a second bearing of the bearings is accommodated in a bearing receptacle that is provided on the cover part. A respective sealing element, in particular a sealing element made of rubber or an elastomeric material, in particular an O-ring, is situated between a respective bearing receptacle and a respective bearing, the sealing elements being elastically deformed, so that the respective sealing element presses the respective bearing against a step of the shaft in each case, in particular, such that the bearings of the shaft are preloaded with respect to each other.

This has the advantage that the bearings are preloaded relative to each other, or in other words, are pressed against a respective step of the shaft. The contact pressure is the spring force that is generated by the elastic deformation of the seals. The particular spring force generated by the elastic deformation of the seal accommodated in the housing part is directed counter to the particular spring force that is generated by the elastic deformation of the seal accommodated in the cover part.

According to example embodiments of the present invention, the seals not only provide sealing of the interior space of the transmission from the external environment but also function as spring elements for the preloading of the bearings relative to one another. This makes it possible so save additional preloading elements and thereby simplifies the production.

According to example embodiments, web regions, which are provided on the housing part and project toward the bearing accommodated in the bearing receptacle of the housing part, restrict the elastic deformation of the seal, the web regions in particular always being situated at the same radial distance and/or being spaced apart from one another in the circumferential direction, and/or the web regions resting against a respective bearing. This offers the advantage that the web regions are able to be produced without additional work because they are produced in the cast component simply by molding.

According to example embodiments, the housing part has bearing receptacles, and a bearing seat is provided in each bearing receptacle, the respective bearing seat in particular being provided with interruptions in the circumferential direction, and bearing surface areas are provided on the side facing away from the bearing seat, in particular the outer side, of the housing part, which are planar and are aligned with one another, in particular, that is to say, the bearing surface areas are provided, especially situated, in a common plane, in particular.

This has the advantage that the housing part is able to be produced as a cast component but the raw cast has a corresponding roughness.

Impressing the stamping tool with its cylindrical stamps allows for a precise production. The relative positioning of the bearing seats, in particular, is able to be produced with high precision because the stamps are jointly situated in a stamping tool. In addition, each one of the bearing seats may be produced with a precise fit. To ensure that the impressing can be carried out in a stable manner, the stable positioning of a working plane is possible on the other side of the housing part. The planar outer surface regions of the housing part are provided for this purpose.

As a result, a simple production is possible.

According to example embodiments, the cover part has bearing receptacles, and a separate bearing seat is provided in each bearing receptacle, the respective bearing seat in particular having an interrupted development in the circumferential direction, planar bearing surface areas, which in particular are aligned with one another, being arranged on the side facing away from the bearing seat, in particular the outer side, of the cover part, the bearing surface areas thus particularly being provided, especially situated, in a common plane. This offers the advantage that the cover part is able to be produced as a cast component, the raw cast being correspondingly rough, however.

A precise production is possible by impressing the stamping tool with its cylindrical stamps. More specifically, the relative positioning of the bearing seats is able to be produced with high precision because the stamps are jointly situated in a stamping tool. Moreover, each of the bearing seats may be produced with an accurate fit. To ensure that the impressing can be carried out in a stable manner, the stable positioning of a working plane is possible on the other side of the cover part. The planar outer surface areas of the cover part are provided for this purpose.

According to example embodiments, a bearing is accommodated with a precise fit in the respective bearing seat in each case. This is considered advantageous insofar as it allows for an accurate mounting.

According to example embodiments, the electric motor has a rotor shaft and a motor housing, and the rotor shaft is rotatably mounted in the motor housing with the aid of at least one bearing, an adapter flange is connected to the motor housing in a torsion-resistant manner, the housing of the transmission has a housing part and a cover part, which are connected to each other, in particular, a bayonet guide region is provided on the housing part, and the adapter flange has a lug region, in particular a bayonet nose, in particular for an engagement behind the bayonet guide region.

This offers the advantage that the motor and the transmission are able to be connected with the aid of the bayonet connection. As a result, a simple production of the drive is possible. In addition, easier servicing can be carried out, in particular an easier exchange of the motor.

In addition, the bayonet connection may be used for centering the motor relative to the transmission.

According to example embodiments, the adapter flange and the motor flange are integrally formed with each other, in particular as one part. This is considered advantageous insofar as it requires a lower number of parts, which also means that less storage space is required for the production.

According to example embodiments, the bayonet guide region projects into a recess of the housing part, the bayonet guide region covering a radial clearance range encompassed by the radial clearance range covered by the lug region, and thus particularly has a radially smaller extension than the lug region, the circumferential angular range covered by the bayonet guide region being smaller than the circumferential angular range covered by the recess, and the circumferential angle range covered by the lug region being smaller in its absolute amount than the difference of the circumferential angular range covered by the recess and the circumferential angular range covered by the bayonet guide region, in particular, such that the lug region is axially insertable into the recess and engages behind the bayonet guide region by a rotation. This offers the advantage that the lug region provided on the adapter flange is axially insertable into the recess, the radial clearance region covered by the lug region including the radial clearance region covered by the bayonet guide region. For the simple reason that the bayonet guide region has a smaller extension than the recess in the circumferential direction in the radial clearance range covered by the bayonet guide region, it is possible to insert the lug region into the recess so that it is able to engage behind the bayonet guide region via its undercut section when the lug region is rotated in the circumferential direction. The lug section thus envelops the bayonet guide region and is in such tight contact with it that it is axially displaced by the bayonet guide region during a rotation in the circumferential direction. This is accomplished as a result of a corresponding contour of the bayonet guide region.

According to example embodiments, the axial width of the bayonet guide region increases in the circumferential direction, in particular: such that the lug region provided on the adapter flange is axially displaced by the bayonet guide region during a rotation in the circumferential direction, in particular so that the axial position is proportional to the rotary angle position of the lug region, and/or so that the adapter flange is pressed toward the housing part when the adapter flange is rotated relative to the housing part in the in the circumferential direction.

This offers the advantage that an improved, i.e. a tighter, contact of the lug region on the bayonet guide region is achievable with the aid of the increasing width, thereby inducing a guidance, in particular a displacement of the lug region in the axial direction.

According to example embodiments, a holding fin that extends from a bearing receptacle of the bearing of the input shaft in the radial direction restricts the recess in the circumferential direction.

According to example embodiments, a further holding fin which extends from a bearing receptacle of the bearing of the input shaft in the radial direction restricts the recess counter to the circumferential direction, the bayonet guide region in particular touching the further holding fin, and the bayonet guide region, the further holding fin and the bearing receptacle being provided, in particular molded, in an integral fashion, in particular in one piece. This offers the advantage that a stable support of the bearing receptacle is achieved. The bearing receptacle itself is thus able to be provided with very thin walls, in particular in an annular or hollow-cylindrical manner. The holding fins extend to a region of the housing part that is located radially farther on the outside, so that this radially farther outwardly situated region is provided in the manner of a frame, which improves the stability. The frame-type region need not be provided as an actual rectangle but may partially also be filled with material so that the stability is improved even further.

According to example embodiments, an elastically deformed seal is situated at the bottom of the cup-shaped bearing receptacle between the bearing receptacle and the bearing accommodated therein, and web regions axially project at the bottom of the bearing receptacle, against which the bearing is resting so that the deformation of the seal is restricted with the aid of the web regions, the elastically deformed seal pressing the bearing against a step which is formed on the input shaft, the input shaft in particular being rotatably mounted relative to the bearing receptacle with the aid of the bearing. This offers the advantage that the seal presses the bearing against a step of the shaft on the one hand and is able to be used as a seal on the other hand. In this context, the contact pressure should be restricted by the web regions and no excessive contact forces are therefore able to be generated.

According to example embodiments, the cover part also includes bearing receptacles arranged in the shape of a cup, and holding fins extend from the respective bearing receptacle to a circumferential edge region of the cover part, axially projecting web regions are arranged on the respective bottom of the cup-shaped bearing receptacle, which restrict the elastic deformation of a respective seal, the respective seal in particular pressing the respective bearing against a step provided on the respective shaft. This offers the advantage that the seal provides sealing on the one hand and axially secures the bearing and presses it against a step of the shaft mounted by the bearing on the other hand.

According to example embodiments, a bolt braced on the housing part is situated in a recess of the housing part and in particular is axially pressed in the direction of the adapter flange by a spring element for locking purposes, in particular. This is considered advantageous insofar as it allows for simple locking of the bayonet connection. An uncomplicated connection is therefore achievable with the aid of the bayonet connection, and spontaneous loosening of the bayonet connection is prevented.

According to example embodiments, a bolt braced on the adapter flange is situated in a recess of the adapter flange and in particular is axially pressed in the direction of the housing part by a spring element, in particular for locking purposes. This is considered advantageous insofar as it allows for simple locking of the bayonet connection. An uncomplicated connection is therefore achievable with the aid of the bayonet connection, and spontaneous loosening of the bayonet connection is prevented.

According to example embodiments, web regions axially that are projecting toward the housing part are arranged on the adapter flange, each projecting into a respective annular groove of the housing part and thus functioning as a guide during the rotary motion of the adapter flange relative to the housing part, the radial clearance region covered by the individual web region being independent of the circumferential angle, the respective web region in particular extending in the circumferential direction, the web regions in particular being situated at the same radial distance but set apart from one another in the circumferential direction. This is considered advantageous insofar as it allows both for easy centering and guidance. An annular groove into which the web regions project and therefore act as a guide may be used, in particular. This is considered advantageous because the guidance and centering are easily achievable with the aid of the web regions. This is so because the web regions on the adapter flange are arranged in the manner of a circle segment and partially project into an annular groove developed on the housing part, so that a guidance comes about when the bayonet connection is operated, i.e. when the adapter flange is rotated relative to the housing part.

According to an example embodiment of the present invention, a method for producing a drive includes a first method step, in which the housing part is produced in a casting process, a second method step, in which a stamping tool is pressed into bearing receptacles of the housing part so that precisely fitting bearing seats are produced, the stamping tool in particular having at least two stamps, and each stamp being provided for the molding of a respective bearing seat, and a third method step, in particular, in which a bearing is particularly accommodated in the respective bearing seat in each case.

This offers the advantage that an uncomplicated production by a casting process may be used and the bearing seats are able to be placed and produced in a highly precise manner by exerting pressure on the stamping tool.

According to example embodiments, the cover part is produced by a casting process in a first production method step, in a second production method step, a stamping tool is pressed into bearing receptacles of the cover part so that bearing seats having a precise fit are produced, the stamping tool in particular having at least two stamps, and each stamp being provided for forming a respective bearing seat, and, in particular, in a third production method step, a respective bearing is accommodated in the respective bearing seat. This offers the advantage that the cover part and also the housing part may be provided with precisely produced bearing seats.

Further features and aspects of example embodiments of the present invention are described in greater detail below with reference to the appended Figures.

DETAILED DESCRIPTION

Figure 8:
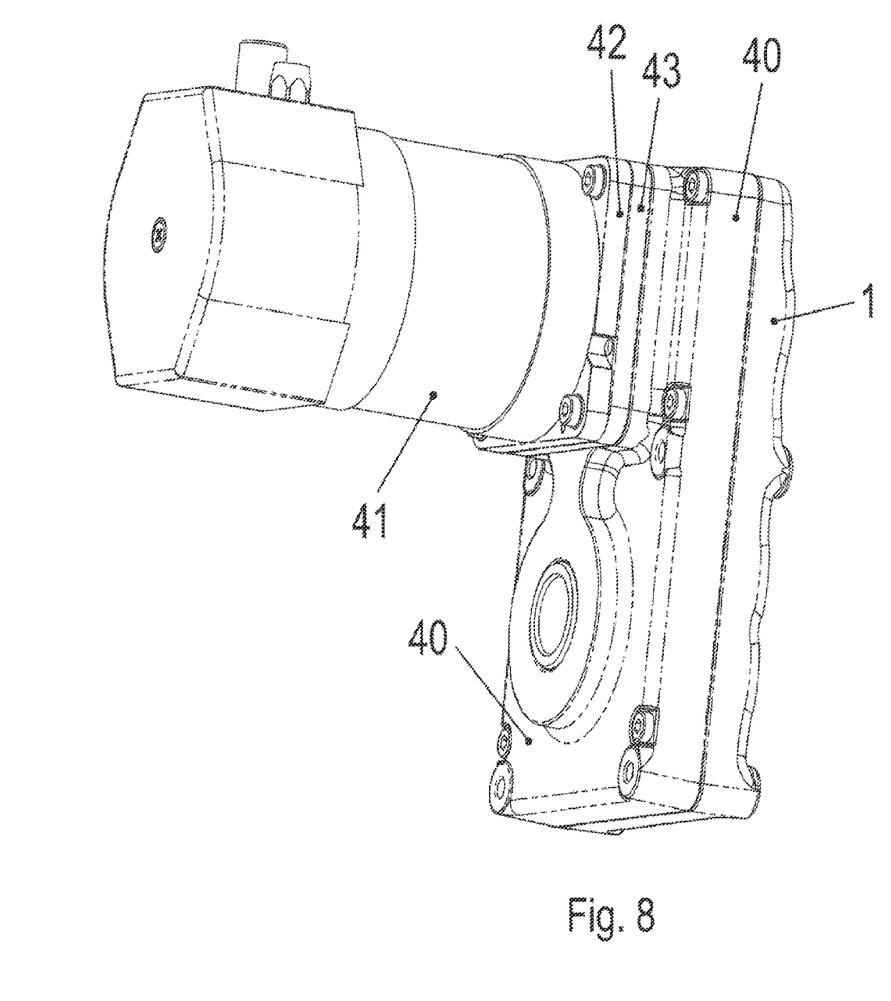
FIG. 8 illustrates the drive having a transmission and an electric motor in an oblique view.
Figure 9:
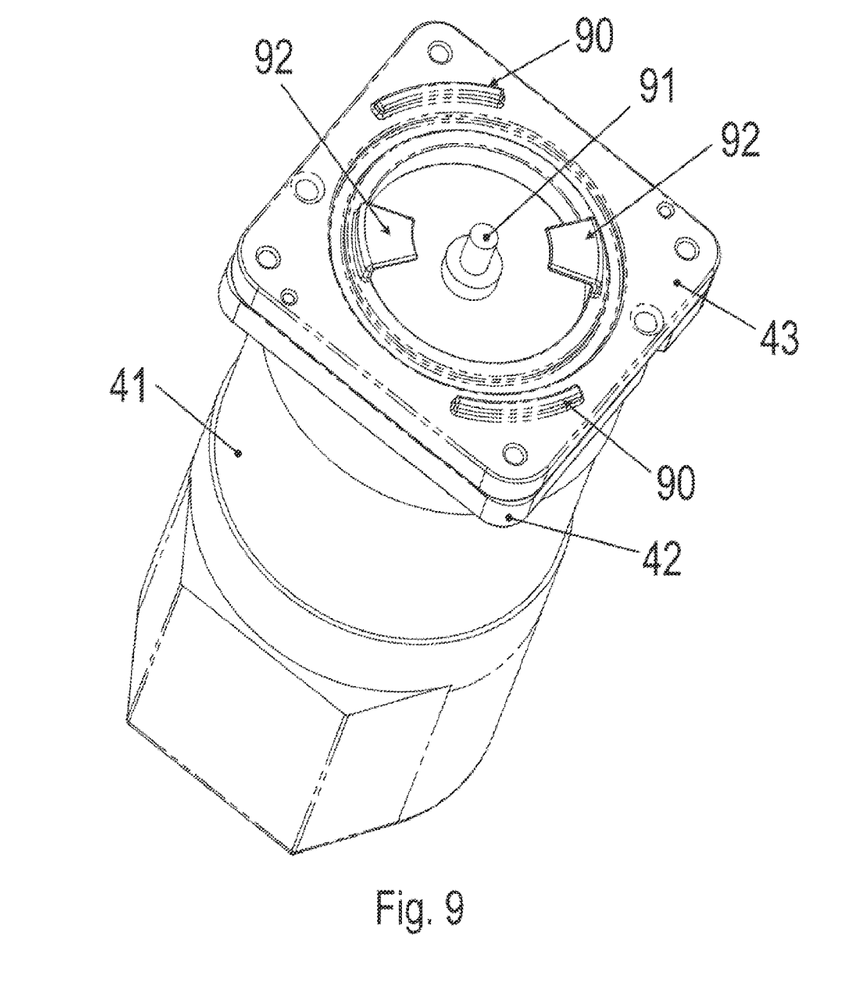
FIG. 9 illustrates the electric motor of the drive in an oblique view.
Figure 10:
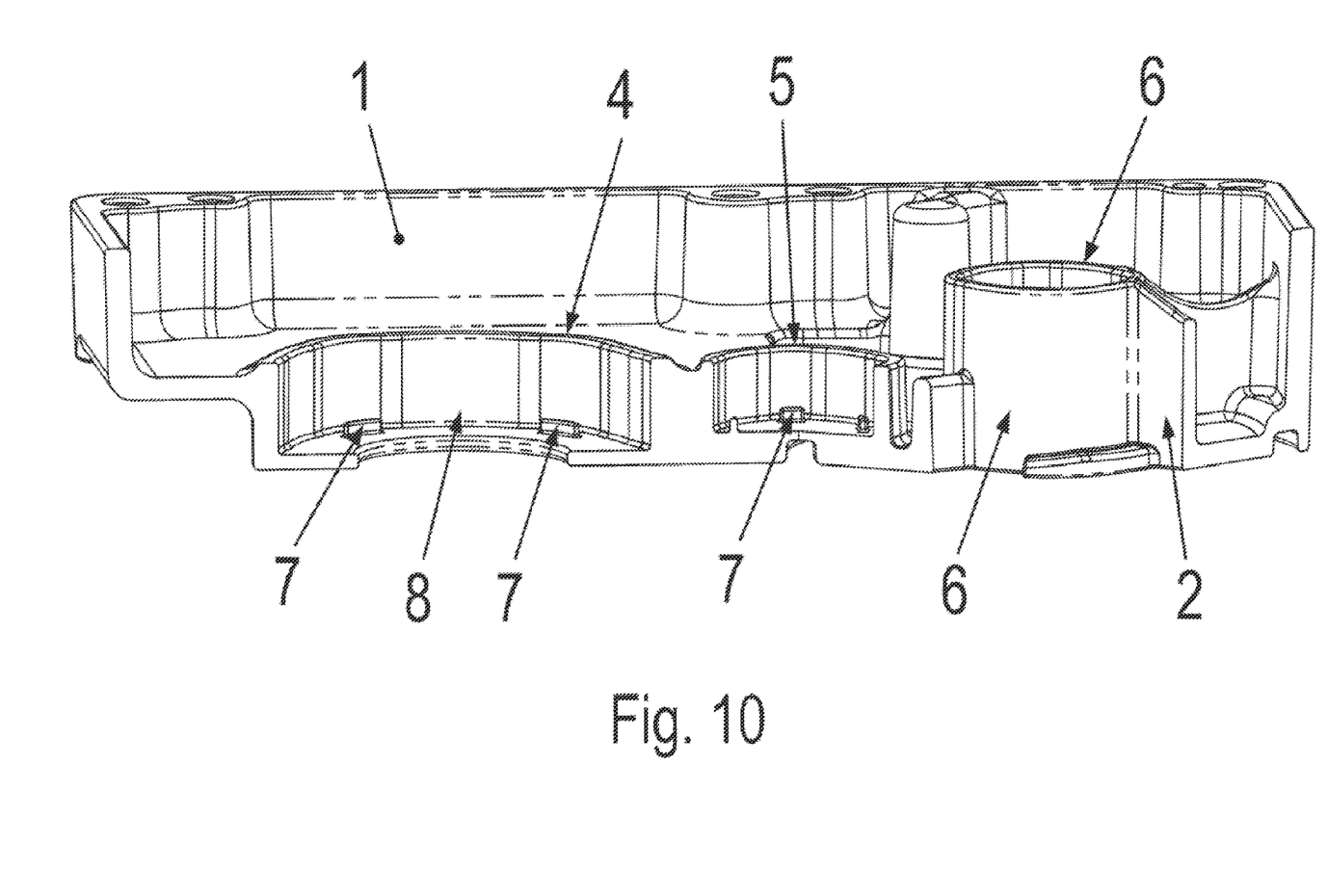
FIG. 10 is a part-sectional and oblique view of cover part 1, the visual angle roughly corresponding to the visual angle of a side view.

As illustrated in the Figures, in particular in FIG. 8, the drive has a transmission which is driven by an electric motor.

As illustrated in the Figures, the electric motor includes a housing part 41, which is connected to a motor flange 42 that is connected to adapter flange 43. The housing of the transmission has a housing part 40 as well as a cover part 1, which is sealingly connected to housing part 40.

Adapter flange 43 is connected to housing part 40, for which purpose a bayonet-type connection is used.

The stator of the electric motor is accommodated in motor housing 41 and also bearings for mounting a rotor shaft of the electric motor. The rotor shaft is connected to input shaft 45 of the transmission with the aid of a clutch in a torsion-resistant manner. For this reason, the clutch has a first clutch part 37, which is connected to the rotor shaft in a manner that is resistant to torsion, an intermediate part 38, which may be produced from a plastic or elastomeric material, and a second clutch part 39, which is connected to input shaft 45 in a torsion-resistant manner.

First clutch part 37 and second clutch part 39 may be produced from metal, and intermediate part 38 may be produced from a material having a lower hardness.

The clutch may be arranged as a dog clutch. Thus, intermediate part 38 is placed between the two clutch parts (37, 39) in the circumferential direction. Torque shocks are able to be damped in this manner.

Connected to the input shaft in a torsion-resistant manner is a first toothed wheel, which is in engagement with a further toothed wheel connected to an intermediate shaft 49 in a torsion-resistant manner. A third toothed wheel, which is in engagement with a toothed wheel that is connected to output shaft 48 in a torsion-resistant manner, is also connected to intermediate shaft 49 in a torsion-resistant manner.

Each shaft is rotatably mounted via bearings 47, which are accommodated either in cover part 1 or in housing part 40.

A separate bearing receptacle (4, 5, 6) is provided on housing part 40 and on cover part 1 in order to accommodate the individual bearing 47. The wall of the respective bearing receptacle (4, 5, 6) has a thin configuration and completely surrounds the bearing in the respective circumferential direction. In the axial direction, the bearing receptacle (4, 5, 6) covers an axial range which encompasses the axial region that is covered by the respective accommodated bearing 47 in the axial direction.

The bearing receptacles (4, 5, 6) are integrally formed, in particular in one piece, either on housing part 40 or on cover part 1 in each case.

Using a molding tool, a cylindrical space region in which the respective bearing 47 is accommodated and resting, is provided on the inner wall of the individual bearing receptacle (4, 5, 6). In the circumferential angular ranges in which the region encompassed by the bearing receptacle (4, 5, 6) has a greater radial extension, the contact surface between the bearing receptacle (4, 5, 6) and bearing 47 is interrupted.

A seal is situated between housing part 40 and a bearing receptacle (4, 5, 6) formed on housing part 40, which presses bearing 47 against a step provided developed on the shaft mounted by this particular bearing 47. The seal is elastically deformed for this purpose, the deformation being restricted by respective web regions 7 that are provided on housing part 40.

Web regions 7, which are formed on housing part 40 and are in contact with the same bearing 47 in each case, are situated at the same radial distance from the axis of rotation of the shaft mounted by this bearing 47. In the circumferential direction, web regions 7 of this particular bearing 47 are set apart from one another, in particular at regular intervals.

The bearing receptacles (4, 5, 6) axially project from the rest of housing part 40 and/or cover part 1.

This remaining cover part 1 is arranged in the form of a trough and has a bottom region from which the bearing receptacles (4, 5, 6) project.

An outer circumferential edge region is situated on remaining cover part 1, which covers an axial region that is also covered by the bearing receptacles (4, 5, 6).

Four holding fins 2, which are set apart from one another in the circumferential direction, extend from this edge region to bearing receptacle 4, which is provided for the accommodation of bearing 47 of output shaft 48. The distance of holding fins 2 in the circumferential direction is not regular. This makes it possible to reduce resonant frequencies.

A connecting fin 3 is set apart from holding fins 2 of bearing receptacle 4, which is provided for the accommodation of bearing 47 of intermediate shaft 49, and extends from bearing receptacle 4 to adjacent bearing receptacle 5.

Two further holding fins 2 are provided on cover part 1, which extend from bearing receptacle 5 to the edge region of cover part 1.

Bearing receptacle 6 of bearing 47 of input shaft 45, too, is stabilized with the aid of four holding fins 2, each extending from bearing receptacle 6 to the edge region of cover part 1 and being set apart from one another in the circumferential direction.

In addition, a further connecting fin 3 is provided, which extends from bearing receptacle 5 to bearing receptacle 6.

A seal is situated between accommodated bearing 47 and cover part 1, in particular the bottom region of cover part 1, which exerts pressure in the axial direction on respective bearing 47 so that it is pressed against a step of the respective shaft mounted by respective bearing 47. The elastic deformation of the seal is restricted by the web regions 7 provided on cover part 1, in particular in the bottom region.

As a result, respective bearing 47 is compressed and sealed with the aid of seal 46.

Cover part 1 is connected to housing part 40 by screws and sealed, i.e. tightly connected, with the aid of an interposed seal.

Figure 6:
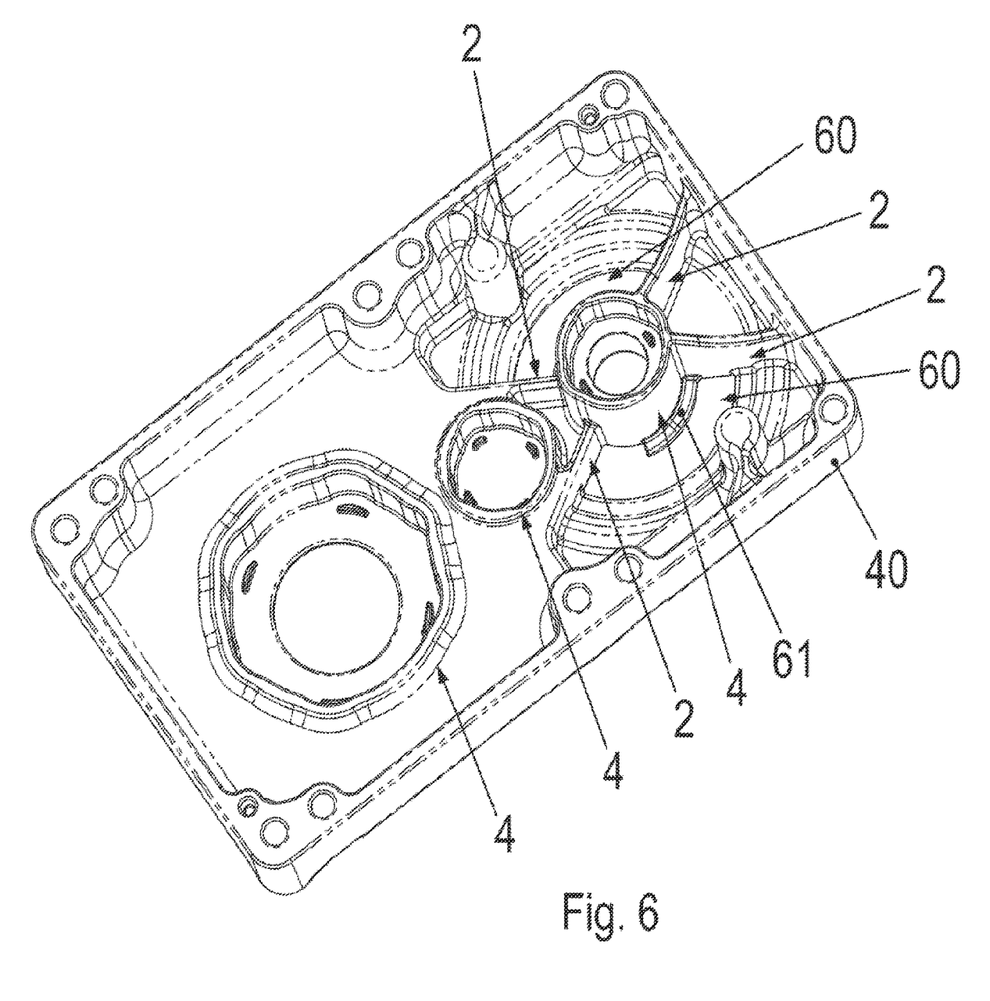
FIG. 6 is an oblique view of a housing part 40 of the drive in an oblique view.
Figure 7:
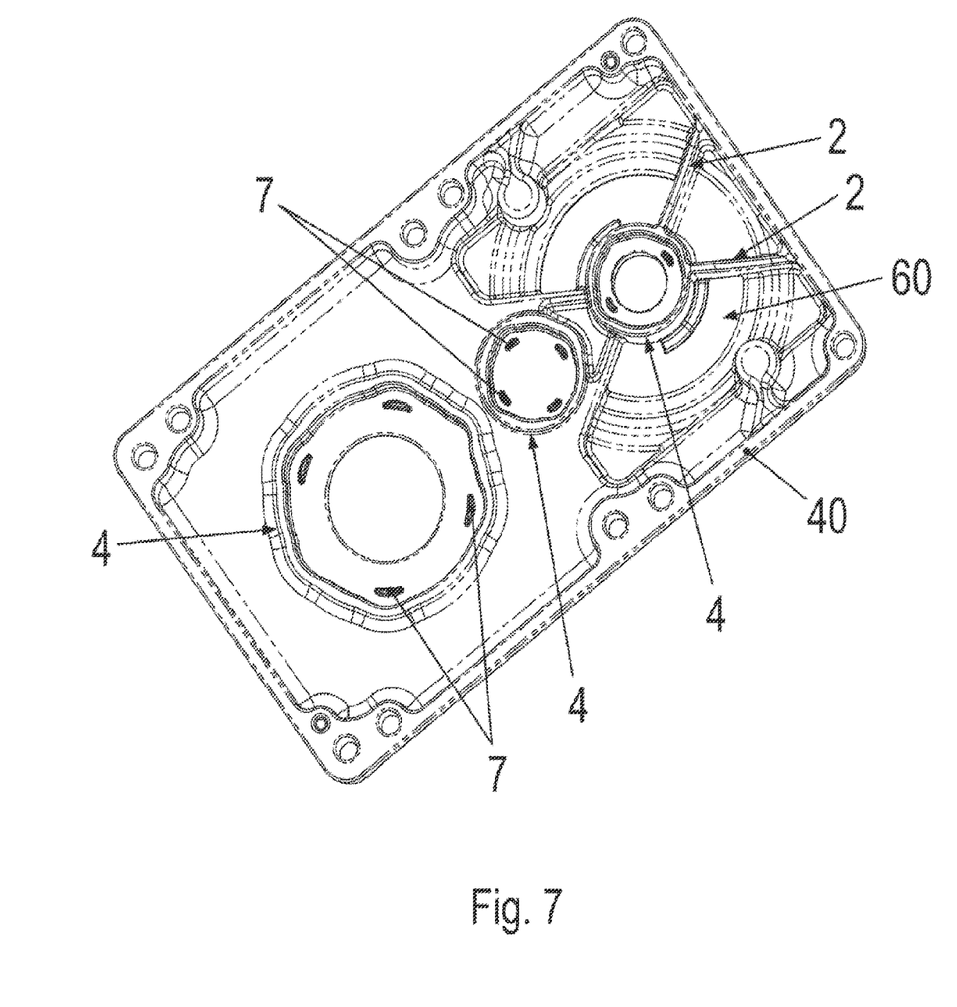
FIG. 7 illustrates housing part 40 in an oblique view from a different visual angle.

As illustrated in FIG. 6, housing part 40 also has a circumferential edge region on the outside. Housing part 40 has a bearing receptacle 4 for input shaft 45, which accommodates a bearing of input shaft 45. Four holding fins 2, which are set apart from one another in the circumferential direction, extend from the edge region to bearing receptacle 4 in each case, in particular so that it is stabilized, in particular with regard to oscillations and/or transverse forces introduced via input shaft 45.

An axial region that encompasses the axial region covered by the bearing of input shaft 45 accommodated in housing part 40, is covered by this edge region.

The bottom region of housing part 40 has a first and a second recess 60, which are provided for the insertion of lug regions 92, in particular bayonet noses.

First recess 60 is restricted by a first of holding fins 2 in the circumferential direction. Second recess 60 is restricted by a second of holding fins 2 counter to the circumferential direction.

The two other holding fins restrict the other recess 60 in the circumferential direction and/or counter to the circumferential direction.

A first bayonet guide region 61 radially projects from bearing recess 4, in particular into recess 60. First bayonet guide region 61 extends across a smaller circumferential angular range than recess 60 and has a smaller radial extension than recess 60.

In addition, a second bayonet guide region 61 radially projects from bearing recess 4, in particular into other recess 60. Second bayonet guide region 61 also extends across a smaller circumferential angular range than second recess 60 and also has a smaller radial extension than second recess 60.

A centrally disposed recess is provided on adapter flange 43, and lug regions 92, which are set apart from one another in the circumferential direction, project radially inward into the recess.

In the circumferential direction, each of the two lug regions 92 has a smaller extension than the difference of the extension of recess 60 and the extension of bayonet guide region 61.

When adapter flange 43 is placed against housing part 40, the respective lug region 92 is thus able to be inserted into the free space available between the restriction of recess 60 in the circumferential direction, i.e. first holding fin 2, and bayonet guide region 61 and becomes effective through a relative rotation of the adapter flange as an undercut behind bayonet guide region 61.

The bayonet guide region has an axial position that increases in the circumferential direction, so that adapter flange 43 is pressed ever more closely or strongly against housing part 40 during the relative rotation. On the one hand, the rotary motion is restricted by the contact of adapter flange 43 with housing part 40 and on the other hand, also by second holding fin 2, which restricts the rotary motion in the circumferential direction.

The axial wall thickness of bayonet guide region 61 may increase in the circumferential direction so that lug region 92 engaging behind is increasingly displaced farther in the axial direction and adapter flange 43 is therefore pressed against housing part 40.

Figure 5:
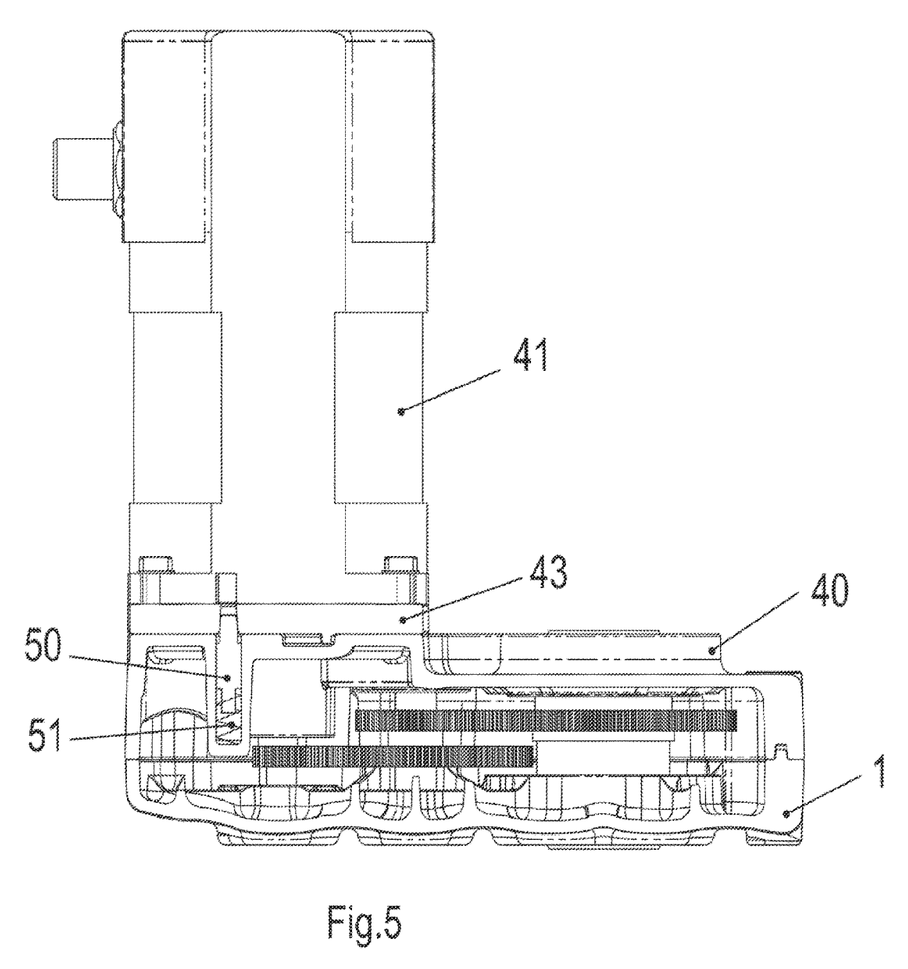
FIG. 5 is a sectional view of the drive, in which a bolt 50 provided for locking purposes can be seen.

For locking purposes, a bolt 50 is guided in a blind hole formed on housing part 40, and a spring element 51 that is braced at the bottom of the blind hole presses bolt 50 in the direction of adapter flange 43.

As soon as a recess introduced into adapter flange 43 is brought into alignment with the blind hole of housing part 40 during the rotary motion, bolt 50 is therefore partially pressed into the recess by spring element 51. As a result, axially aligned bolt 50 then projects into the recess of adapter flange 43 via its region that projects from housing part 40, thereby stopping the rotary motion.

Formed on adapter flange 43 are web regions 90 axially projecting toward housing part 40, which project into an annular groove of housing part 40 and thus act as guides during the rotary motion. The respective web region 90 extends in the circumferential direction, and the web regions are disposed at the same radial distance but are set apart from one another in the circumferential direction.

Each one of the shafts (45, 48, 49) is mounted via two bearings, and each bearing is axially acted upon by a seal (44, 46) so that the bearings are preloaded relative to each other. A first bearing of a first shaft of the shafts (45, 48, 49) is accommodated in cover part 1 and the other bearing of this first shaft is accommodated in housing part 40. The first seal is accommodated in cover part 1 and presses against the first bearing of the first shaft. The second seal is accommodated in housing part 40 and presses against the second bearing of the first shaft. As a result, the first seal presses the first bearing against a first step on the first shaft, and the second seal presses the second bearing against a second step of the first shaft. The bearings are therefore positioned with preloading relative to each other. The seals may be arranged as O-rings or as flat seals in each case.

In order to produce precisely manufactured bearing seats for the accommodated bearings of all shafts of the transmission, a forming tool is employed after the production by a casting process.

Figure 1:
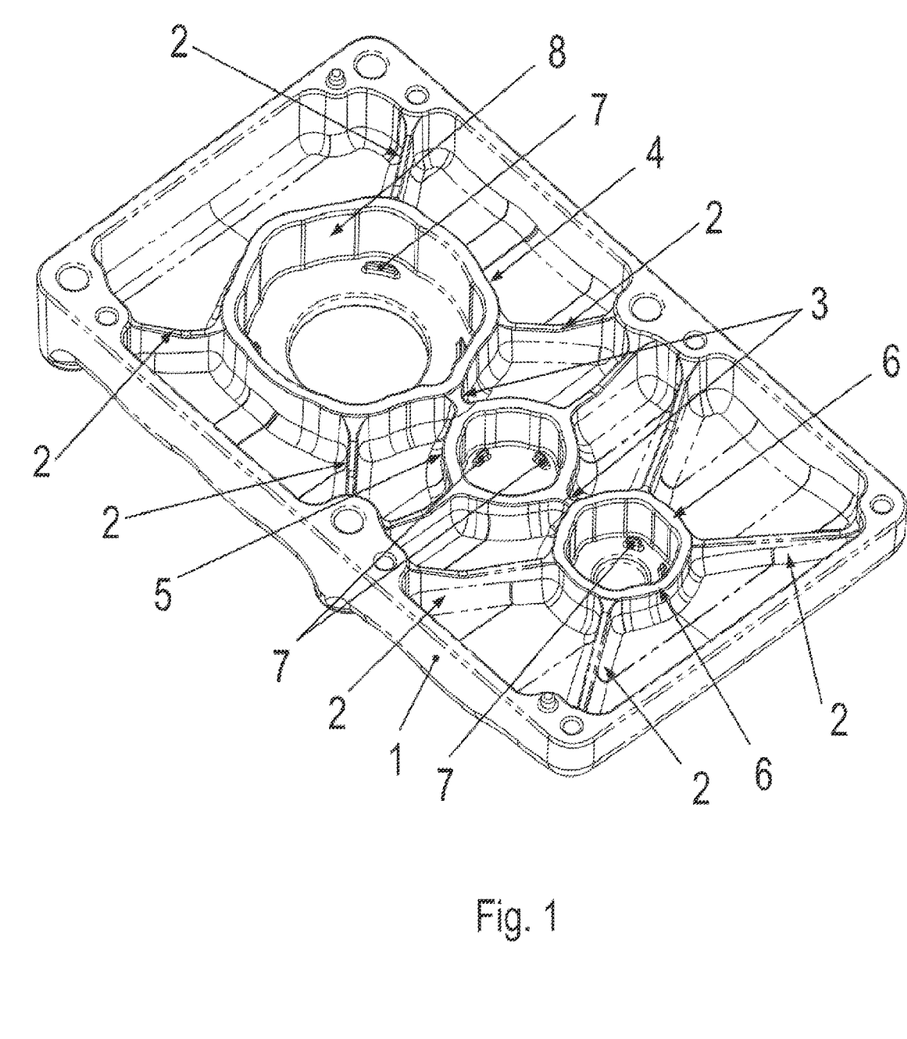
FIG. 1 is an oblique view of a cover part 1 of the drive according to an example embodiment of the present invention from a first visual angle.
Figure 2:
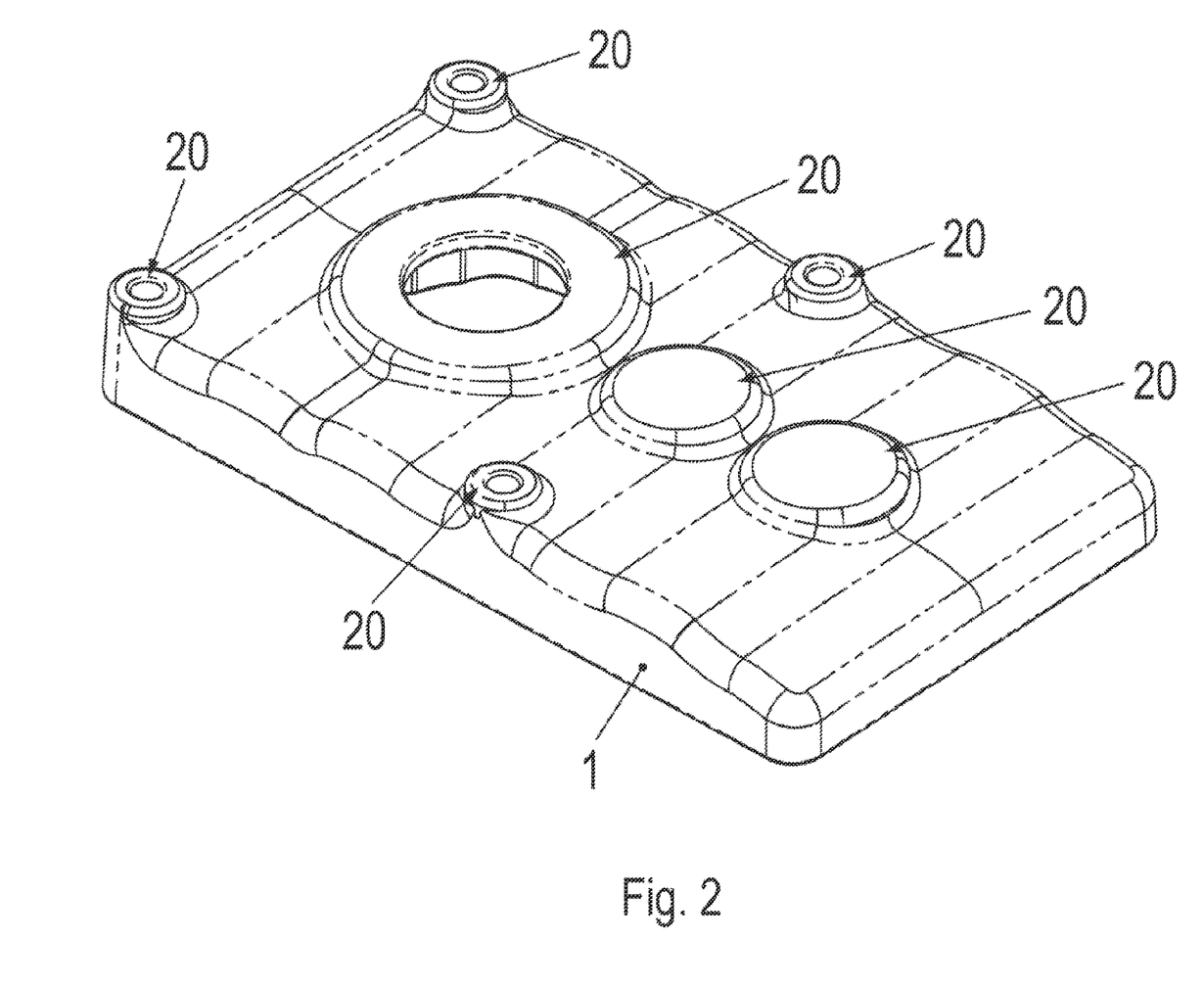
FIG. 2 is an oblique view of cover part 1 from a different visual angle.
Figure 3:
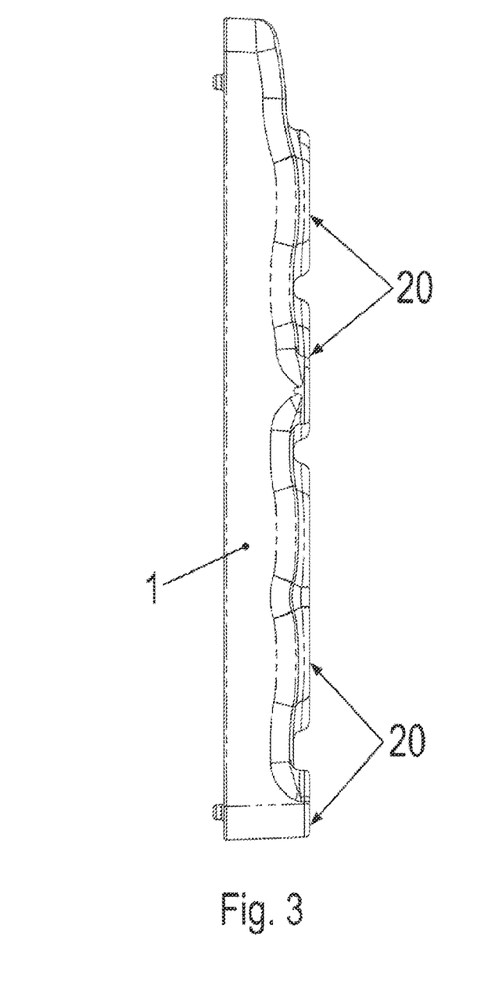
FIG. 3 is a side view of cover part 1.
Figure 4:
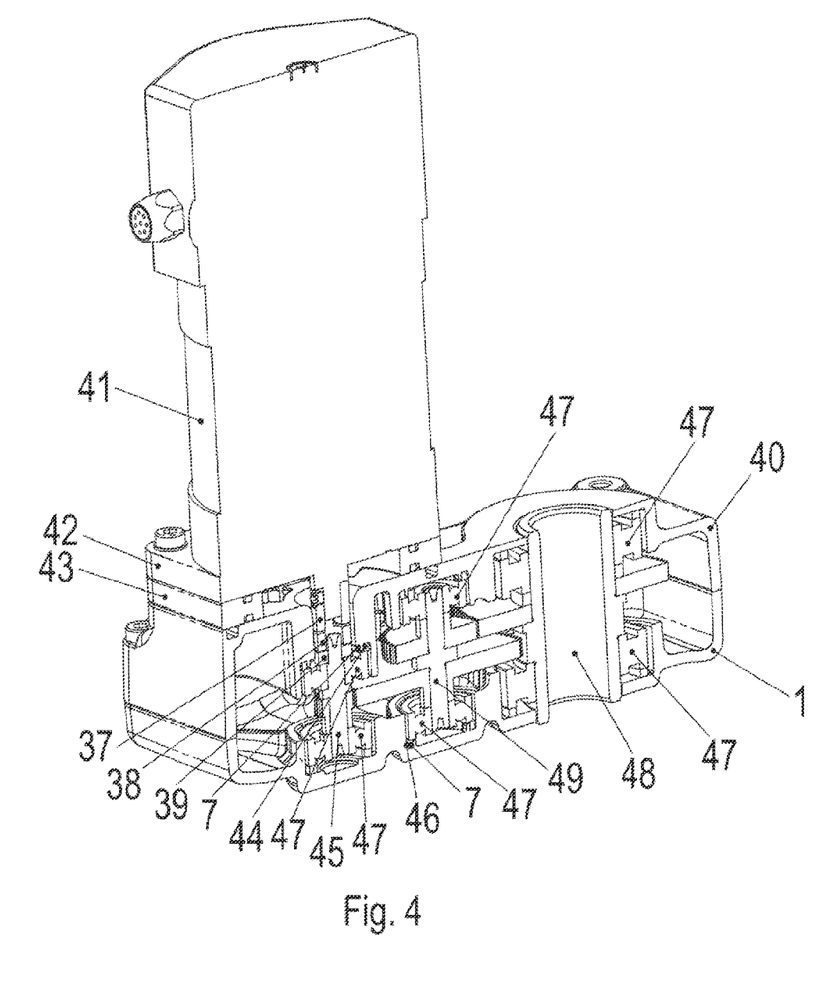
FIG. 4 is the drive in a part-sectional oblique view.

Cover part 1 is thus produced in a first production method step as a cast component. By its outer side, i.e. by the side that faces away from the motor in the subsequently produced drive, cover part 1 is then placed on a planar surface. As illustrated in FIG. 3, cover part 1 has planar, i.e. level, bearing surface areas 20. As a result, cover part 1 is situated on the planar surface, e.g., a work table, in a stable manner. A stamp as a molding tool is then pressed into each one of the bearing receptacles, the stamp having a cylindrical shape. In this manner, the bearing seats in the bearing receptacles are brought to the proper fit. The stamps for the bearing receptacles may be impressed in a synchronous manner. The relative position and alignment of the bearing seats can thus be ensured with high precision. Tilting of cover part 1 when the stamping tool is impressed is thereby prevented.

Cylindrical sections 8 of the wall of the respective bearing receptacle are thus able to be produced with an accurate fit. However, these sections are not produced in a contiguous form but are set apart from one another in the circumferential direction. As a result, the cylindrical sections of the wall of the respective bearing receptacle alternate with respective adjacent sections that have a radially greater extension.

The described method for the production of precisely fitting bearing seats is also executed for housing part 40. Toward this end, said housing part 40 has planar surface sections on the side facing the motor so that it may be placed on a planar surface in a stable manner and the stamping tools for the accurate production of the bearing seats are able to be synchronously impressed into the bearing receptacles. This prevents tilting of housing part 40 when the stamping tool is pressed in. The bearing seats consequently have a precise alignment relative to one another and are also produced with a precise fit as far as their individual shape is concerned.

Adapter flange 43 and motor flange 42 may be integrally formed, i.e. in one piece with each other.

LIST OF REFERENCE NUMERALS 1 cover part
2 holding fin
3 connecting fin
4 bearing receptacle
5 bearing receptacle
6 bearing receptacle
7 web region
8 cylindrical section of the wall of the bearing receptacle 4
20 bearing surface area
37 first clutch part
38 intermediate part
39 second clutch part
40 housing part
41 motor housing
42 motor flange
43 adapter flange
44 seal
45 input shaft
46 seal
47 bearing
48 output shaft
49 intermediate shaft 50 bolt
51 spring element
60 recess for bayonet nose
61 bayonet guide region
90 web region
91 rotor shaft
92 lug region, in particular bayonet nose

What is claimed is:

1. A drive, comprising:
a transmission including a housing, the housing of the transmission having a housing part and a cover part connected to each other, the housing part including a bayonet guide region being developed on the housing part; and
an adapter flange adapted to connect to a motor housing of a motor in a torsion-resistant manner, the adapter flange having a lug region adapted for an engagement behind a bayonet guide region projecting into a recess of the housing part, the recess being restricted in a circumferential direction by a holding fin provided on the housing part and extending from a bearing receptacle of a bearing of an input shaft of the transmission, in relation to an axial direction of the input shaft, in a radial direction;
wherein the recess is restricted counter to the circumferential direction by a further holding fin provided on the housing and extending from the bearing receptacle of the bearing of the input shaft in the radial direction.

2. The drive according to claim 1, wherein the motor is arranged as an electric motor including a rotor shaft and the motor housing, the rotor shaft rotatably mounted in the motor housing by at least one bearing.

3. The drive according to claim 1, wherein the lug region includes a bayonet nose adapted for engagement behind the bayonet guide region projecting into the recess of the housing part.

4. The drive according to claim 1, wherein the bayonet guide region touches the further holding fin, the bayonet guide region, the further holding fin, and the bearing receptacle being integrally provided and/or molded as one part.

5. The drive according to claim 1, wherein the adapter flange and a motor flange are integral with each other.

6. The drive according to claim 1, wherein the bayonet guide region covers a radial clearance region which is encompassed by a radial clearance region covered by the lug region, and has a radially smaller extension than the lug region, a circumferential angular region covered by the bayonet guide region being smaller than a circumferential angular region covered by the recess, a circumferential angular region covered by the lug region being smaller in absolute amount than a difference of the circumferential angular region covered by the recess and the circumferential angular range covered by the bayonet guide region, the lug region being axially insertable into the recess and engages behind the bayonet guide region by a rotation.

7. The drive according to claim 1, wherein an axial width of the bayonet guide region increases in a circumferential direction, the lug region provided on the adapter flange being axially displaced by the bayonet guide region through a rotation in the circumferential direction, so that an axial position is proportional to a rotary angle position of the lug region, and/or the adapter flange being pressed toward the housing part when the adapter flange is rotated relative to the housing part in the circumferential direction.

8. The drive according to claim 1, wherein a bolt braced on the housing part is provided in a recess of the housing part and is axially pressed toward the adapter flange by a spring, for locking purposes, and/or a bolt which is braced on the adapter flange is provided in a recess of the adapter flange, the bolt being axially pressed toward the housing part by a spring, for locking purposes.

9. The drive according to claim 1, wherein web regions axially projecting toward the housing part are provided on the adapter flange and project into a respective annular groove of the housing part and act as guides during rotatory motion of the adapter flange relative to the housing part, a radial clearance region covered by a respective web region is independent of a circumferential angle, the respective web region extending in a circumferential direction, the web regions being arranged at a same radial distance but being set apart from one another in the circumferential direction.

10. The drive according to claim 1, wherein a shaft and/or an input shaft of the transmission is mounted via the bearing as a first bearing and via a second bearing, the first bearing being accommodated in a bearing receptacle provided on the housing part, and the second bearing being accommodated in a bearing receptacle provided on the cover part.

11. The drive according to claim 1, wherein an individual seal is arranged between a respective bearing receptacle and a respective bearing, which is elastically deformable so that the respective bearing is pressed against a step of the shaft by the respective seal, so that the bearings of the shaft are preloaded with respect to one another.

12. The drive according to claim 11, wherein the individual seal is made of rubber and/or an elastomer material, and/or wherein the individual seal is arranged as an O-ring.

13. The drive according to claim 11, wherein web regions projecting toward the bearing are arranged on the housing part and accommodated in the bearing receptacle, the web regions restricting elastic deformation of the seal, the web regions being arranged at a same radial distance and/or being set apart from one another in a circumferential direction, and/or the web regions resting against a respective bearing.

14. The drive according to claim 11, wherein the seal is arranged at a bottom of a cup-shaped bearing receptacle between the bearing receptacle and the bearing accommodated in the bearing receptacle, web regions axially projecting at the bottom of the bearing receptacle, against which the bearing is resting so that the deformation of the seal is restricted with the aid of the web regions, the seal pressing the bearing against a step provided on the shaft, the shaft being rotatably mounted relative to the bearing receptacle with the aid of the bearing.

15. The drive according to claim 11, wherein cup-shaped bearing receptacles are provided on the cover part, holding fins extend from a respective bearing receptacle to a circumferential edge region of the cover part, and axially projecting web regions are provided on a respective bottom of a cup-shaped bearing receptacle, which restrict elastic deformation of a respective seal, the respective seal pressing the respective bearing onto a step provided on a respective shaft.

16. The drive according to claim 1, wherein the housing part has the bearing receptacles, and a separate bearing seat is provided in each of the bearing receptacles, the respective bearing seat being interrupted in a circumferential direction, planar bearing surface areas that are aligned with respect to one another being provided on a side facing away from the bearing seat of the housing part, the bearing surface areas being provided in a common plane.

17. The drive according to claim 1, wherein the cover part includes bearing receptacles, and a separate bearing seat is provided in each bearing receptacle, a respective bearing seat including interruptions in a circumferential direction, planar bearing surface areas, which are aligned with one another, being arranged on the side facing away from the bearing seat of the cover part, the bearing surface areas being provided in a common plane, and/or a respective bearing being accommodated with a precise fit in a respective bearing seat.

18. An adapter flange adapted to connect, in a torsion-resistant manner, to a motor housing of a motor of a drive, the drive including a transmission having a housing, the housing of the transmission having a housing part and a cover part connected to each other, the housing part including a bayonet guide region being developed on the housing part, comprising:
    a lug region adapted for an engagement behind a bayonet guide region projecting into a recess of the housing part, the recess being restricted in a circumferential direction by a holding fin provided on the housing part and extending from a bearing receptacle of a bearing of an input shaft of the transmission, in relation to an axial direction of the input shaft, in a radial direction;
    wherein the recess is restricted counter to the circumferential direction by a further holding fin provided on the housing and extending from the bearing receptacle of the bearing of the input shaft in the radial direction.

* * * * *